(12) United States Patent
Mayuzumi

(10) Patent No.: US 8,040,384 B2
(45) Date of Patent: Oct. 18, 2011

(54) IMAGE TRANSMISSION APPARATUS

(75) Inventor: Ichiko Mayuzumi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 738 days.

(21) Appl. No.: 11/675,391

(22) Filed: Feb. 15, 2007

(65) Prior Publication Data

US 2007/0209056 A1    Sep. 6, 2007

(30) Foreign Application Priority Data

Mar. 2, 2006  (JP) .................................. 2006-056495

(51) Int. Cl.
*H04N 5/232*    (2006.01)
(52) U.S. Cl. ............... 348/211.3; 348/207.1; 348/207.2; 348/231.6; 348/231.9
(58) Field of Classification Search ............... 348/207.1, 348/207.99, 211.1, 211.4, 333.01, 552, 207.2, 348/207.11, 211.3, 211.9, 211.99, 231.3, 348/231.6, 231.9
See application file for complete search history.

(56) References Cited

U.S. PATENT DOCUMENTS

| | | | |
|---|---|---|---|
| 6,603,506 B2* | 8/2003 | Ogawa et al. ............... | 348/207.2 |
| 6,806,978 B1* | 10/2004 | Tamura et al. ............... | 358/1.15 |
| 7,436,554 B2 | 10/2008 | Nitta et al. | |
| 7,483,051 B2* | 1/2009 | Aiso ........................... | 348/207.2 |
| 7,495,697 B2* | 2/2009 | Ward et al. ................. | 348/231.3 |
| 2004/0095600 A1 | 5/2004 | Nitta et al. | |
| 2004/0179046 A1 | 9/2004 | Inoue et al. | |
| 2004/0223060 A1* | 11/2004 | Yasuda ....................... | 348/207.1 |
| 2006/0125927 A1* | 6/2006 | Watanabe ................... | 348/211.1 |
| 2009/0046158 A1 | 2/2009 | Nitta et al. | |

FOREIGN PATENT DOCUMENTS

| | | |
|---|---|---|
| CN | 1501710 A | 6/2004 |
| JP | 2002-199251 A | 7/2002 |
| JP | 2004-320614 A | 11/2004 |
| JP | 2005-033255 A | 2/2005 |

* cited by examiner

*Primary Examiner* — Lin Ye
*Assistant Examiner* — Chriss Yoder, III
(74) *Attorney, Agent, or Firm* — Canon USA Inc. IP Division

(57) ABSTRACT

An image transmission apparatus (adaptor apparatus) is configured to transmit image data captured by an image pickup apparatus to an output apparatus. The adaptor apparatus is configured to obtain identification information of the image pickup apparatus and type information of the output apparatus. The adaptor apparatus selects a set of parameters corresponding to the identification information of the image pickup apparatus and the type information of the output apparatus. The adaptor apparatus outputs the selected set of parameters to the image pickup apparatus which converts image data into visible image data based on the selected set of parameters. The adaptor apparatus transmits visible image data received from the image pickup apparatus to the output apparatus.

10 Claims, 16 Drawing Sheets

FIG.12

| | PARAMETER | PARAMETER RANGE |
|---|---|---|
| FILE | PIXEL NUMBER | L, M1, M2, S |
| | COMPRESSION RATE | SUPER FINE, FINE, NORMAL |
| | FILE FORMAT | JPEG, TIFF |
| IMAGE QUALITY ADJUSTMENT | COLOR EFFECT (CUSTOM) CONTRAST SHARPNESS DEPTH OF COLOR | OFF, CUSTOM<br>− (WEAK), 0 (STANDARD), + (STRONG)<br>− (WEAK), 0 (STANDARD), + (STRONG)<br>− (THIN), 0 (STANDARD), + (THICK) |
| | WHITE BALANCE (CUSTOM) | AUTO, COLOR TEMP. SETTING FROM MAGENTA (−100) TO GREEN (+100) |
| | DIGITAL EXPOSURE CORRECTION | FROM −2.0 TO +2.0 |
| | COLOR SPACE DESIGNATION | adobeRGB, sRGB |

FIG.13

| PARAMETER | | OUTPUT APPARATUS | | | | |
|---|---|---|---|---|---|---|
| | | LCD | CRT | PLASMA DISPLAY | PRINTER | EXTERNAL IMAGE SERVER |
| FILE | PIXEL NUMBER | M1 | S | M1 | L | S |
| | COMPRESSION RATE | FINE | NORMAL | FINE | SUPER FINE | NORMAL |
| | FILE FORMAT | JPEG | JPEG | JPEG | JPEG | JPEG |
| IMAGE QUALITY ADJUSTMENT | COLOR EFFECT (CUSTOM) CONTRAST SHARPNESS COLOR DEPTH | CUSTOM WEAK STRONG THICK | OFF | CUSTOM STRONG STRONG STANDARD | CUSTOM STRONG STANDARD STANDARD | OFF |
| | WHITE BALANCE (CUSTOM) | CUSTOM -30 | AUTO | CUSTOM +30 | AUTO | AUTO |
| | DIGITAL EXPOSURE CORRECTION | -1.5 | 0 | 0 | 0 | 0 |
| | COLOR SPACE DESIGNATION | sRGB | sRGB | sRGB | adobeRGB | adobeRGB |

FIG.14

| PARAMETER | | PARAMETER RANGE |
|---|---|---|
| FILE | PIXEL NUMBER | 10-2000 pixel/inch |
| | COMPRESSION RATE | FROM 1 (HIGH) TO 4 (LOW) |
| | FILE FORMAT | JPEG, TIFF |
| IMAGE QUALITY ADJUSTMENT | COLOR EFFECT (CUSTOM) CONTRAST SHARPNESS COLOR DEPTH | OFF, VIVID COLOR, NEUTRAL COLOR, SOFT, SEPIA, B/W, WHITE SKIN, BROWN SKIN, COOL, WARM, POSIFILM FROM -5 TO +5 FROM 0 TO +10 FROM -5 TO +5 |
| | WHITE BALANCE (CUSTOM) | AUTO, SUN LIGHT, CLOUDY, BULB, FLUORESCENT, FLUORESCENT H, FLASH, UNDERWATER |
| | DIGITAL EXPOSURE CORRECTION | FROM -2.0 TO +2.0 |
| | COLOR SPACE DESIGNATION | adobeRGB, sRGB |

FIG.15

| PARAMETER | | OUTPUT APPARATUS | | | | |
|---|---|---|---|---|---|---|
| | | LCD TV | CRT TV | PLASMA TV | PRINTER | EXTERNAL IMAGE SERVER |
| FILE | PIXEL NUMBER | 1000 | 500 | 1000 | 2000 | 500 |
| | COMPRESSION RATE | 3 | 2 | 3 | 4 | 2 |
| | FILE FORMAT | JPEG | JPEG | JPEG | JPEG | JPEG |
| IMAGE QUALITY ADJUSTMENT | COLOR EFFECT | NEUTRAL | OFF | VIVID | VIVID | OFF |
| | WHITE BALANCE | AUTO | AUTO | AUTO | AUTO | AUTO |
| | DIGITAL EXPOSURE CORRECTION | -1.5 | 0 | 0 | 0 | 0 |
| | COLOR SPACE DESIGNATION | sRGB | sRGB | sRGB | adobeRGB | adobeRGB |

FIG.16

| DIGITAL CAMERA IDENTIFIER | SET OF DEVELOPMENT PARAMETER SETTING VALUES |
|---|---|
| XXX | A |
| YYY | A |
| ZZZ | A |
| WWW | B |

FIG.17

| DIGITAL CAMERA IDENTIFIER | STORAGE DESTINATION OF DEVELOPMENT PARAMETER SETTING VALUES |
|---|---|
| XXX | 1. http://...... |
| YYY | 2. http://...... |
| ZZZ | 3. http://...... |
| WWW | 4. http://...... |

IMAGE TRANSMISSION APPARATUS

BACKGROUND OF THE INVENTION

1. Field of the Invention

The present invention relates to an apparatus configured to process an image captured by a camera and transmit the processed image data to an output apparatus.

2. Description of the Related Art

Digital cameras can be used in various ways. For example, as discussed in Japanese Patent Application Laid-Open No. 2002-199251, a digital camera can be associated with a pan-head having a pan-tilt mechanism so that a remote control of the pan-tilt mechanism can be realized by a user and a captured image can be transmitted to a designated destination.

There are many digital cameras excellent in functions to be realized, quality of image, and number of pixels. To obtain further excellent image quality, digital cameras can directly store RAW format image data without applying image processing to image data obtained from an image pickup element. When RAW format image data is supplied to a personal computer (PC) or other image processing apparatus, high quality image processing using RAW format image data can be realized.

However, if RAW format image data is used in the system discussed in Japanese Patent Application Laid-Open No. 2002-199251, the system cannot realize the function as intended because an external output apparatus cannot display the raw image data.

Therefore, before transferring RAW format image data to an external output apparatus, a user of a digital camera is required to input RAW format image data to a PC and perform predetermined development processing for converting raw image data to visible image data. Furthermore, the processing using a PC requires sufficient knowledge and experience to handle the PC. Transferring a large amount of RAW format image data to the PC requires a significant time.

SUMMARY OF THE INVENTION

Exemplary embodiments of the present invention are directed to a technique enabling an image pickup apparatus to apply image processing to RAW format image data considering characteristics of an output destination apparatus on a network and providing, to each output apparatus, image data matching characteristics of the output apparatus (e.g., a display apparatus and a printing apparatus).

According to an aspect of the present invention, an image transmission apparatus is capable of connecting to an image pickup apparatus to transmit image data captured by the image pickup apparatus to an output apparatus. The image transmission apparatus includes a first communication unit to obtain identification information of the image pickup apparatus from the image pickup apparatus and a second communication unit to obtain type information of the output apparatus. The image pickup apparatus further includes a storage unit configured to store a plurality of sets of parameters into a memory and a controller configured to select, from the plurality of sets of parameters stored in the memory, a set of parameters corresponding to the identification information of the image pickup apparatus received by the first communication unit and the type information of the output apparatus received by the second communication unit. The controller outputs the selected set of parameters to the image pickup apparatus so that the image pickup apparatus can perform processing for converting image data into visible image data. The first communication unit obtains visible image data from the image pickup apparatus, and the second communication unit transmits the obtained visible image data to the output apparatus.

According to another aspect of the present invention, an image pickup apparatus receives image data from an image pickup element and transmits the image data to an output apparatus. A communication unit transmits, to a server, identification information of the image pickup apparatus and type information of the output apparatus obtained from the output apparatus to obtain a set of parameters corresponding to the image pickup apparatus. An image processing unit converts the image data obtained from the image pickup element into visible image data based on the set of parameters obtained from the server which correspond to the identification information of the image pickup apparatus and the type information of the output apparatus. The communication unit transmits the visible image data obtained by the image processing unit to the output apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 12 illustrates an exemplary definition of development parameters according to an embodiment of the present invention.

FIG. 13 illustrates an exemplary set of development parameter setting values according to an embodiment of the present invention.

FIG. 14 illustrates an exemplary definition of development parameters according to an embodiment of the present invention.

FIG. 15 illustrates an exemplary set of development parameter setting values according to an embodiment of the present invention.

FIG. 16 is a table illustrating a relationship between digital camera identifiers and the sets of development parameter setting values according to an embodiment of the present invention.

FIG. 17 is a table illustrating a relationship between digital camera identifiers and storage destinations of development parameter setting values according to an embodiment of the present invention.

DETAILED DESCRIPTION OF THE EMBODIMENTS

Figure 1:
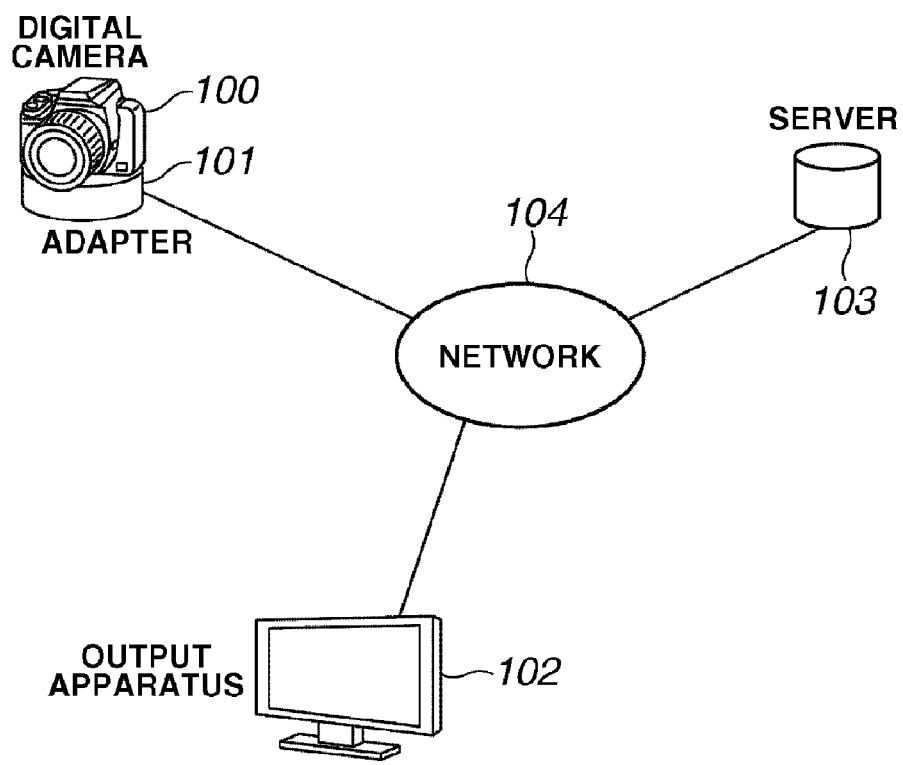
FIG. 1 is a system arrangement according to an exemplary embodiment.

The following description of exemplary embodiments is merely illustrative in nature and is in no way intended to limit the invention, its application, or uses.

Processes, techniques, apparatus, and systems as known by one of ordinary skill in the art may not be discussed in detail but are intended to be part of the enabling description where appropriate.

For example, certain circuitry for image processing, data processing, and other uses may not be discussed in detail. However these systems and the methods to fabricate these system as known by one of ordinary skill in the relevant art is intended to be part of the enabling disclosure herein where appropriate.

It is noted that throughout the specification, similar reference numerals and letters refer to similar items in the following figures, and thus once an item is defined in one figure, it may not be discussed for following figures. Exemplary embodiments will be described in detail below with reference to the drawings.

First Exemplary Embodiment

FIG. 1 is a system arrangement according to an exemplary embodiment. The exemplary system shown in FIG. 1 includes a digital camera 100 functioning as an image pickup apparatus, an adapter 101 functioning as an image transmission apparatus, an output apparatus 102 functioning as a network device, and a server 103. Although not shown in FIG. 1, plural adapters and plural output apparatus can be connected to a network 104. The output apparatus 102 is, for example, a display apparatus displaying image data or a printing apparatus producing a print output of image data.

The digital camera 100 can perform a shooting action (including the control of zoom, focus, and exposure) for capturing a still image or a moving image in accordance with an external operation command.

The digital camera 100 can be easily attached to or removed from the adapter 101. The adapter 101 includes a driving mechanism for a motor that can control a pan angle and a tilt angle of the digital camera 100 attached on the adapter 101. The adapter 101 includes a connector that electrically connects the digital camera 100 to the adaptor 101, so that an image captured by the digital camera 100 can be transferred to the adapter 101.

The adapter 101 can transfer an image to the output apparatus 102 in response to an operation command of the output apparatus 102, transfer an operation command to the digital camera 100, and control the pan and tilt angles of the digital camera 100.

The output apparatus 102 can function as an operation terminal that outputs an operation command to the adapter 101 via the network 104.

Figure 2:
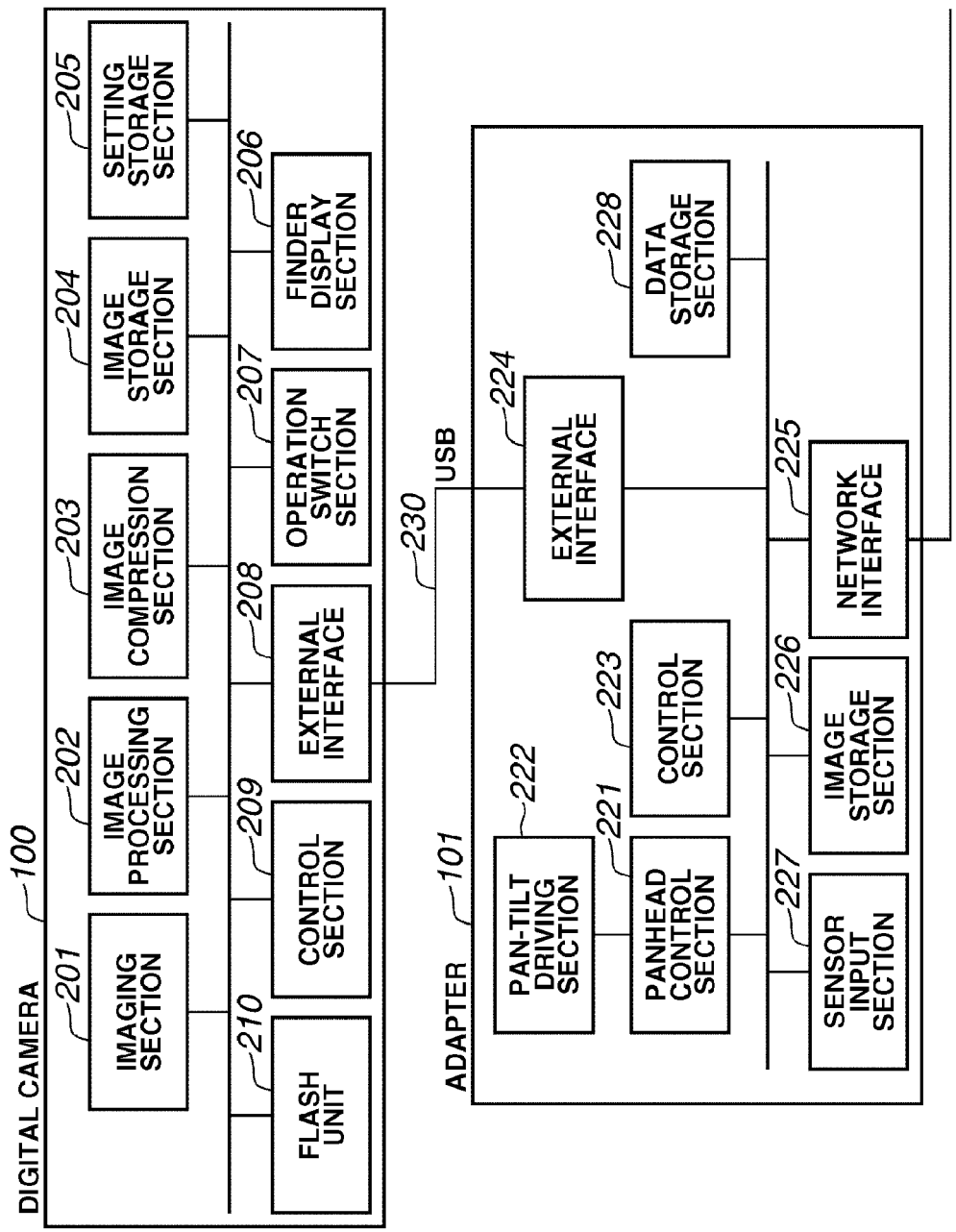
FIG. 2 is a block diagram illustrating a digital camera and an adapter according to an exemplary embodiment.

FIG. 2 is a block diagram illustrating the digital camera 100 and the adapter 101 according to an exemplary embodiment.

The digital camera 100 can function as an image pickup apparatus. More specifically, the digital camera 100 includes an imaging section 201, an image processing section 202, an image compression section 203, an image storage section 204, a setting storage section 205, a finder display section 206, an operation switch section 207, an external interface 208, a control section 209, and a flash unit 210.

The imaging section 201 includes a lens, an image pickup element, and an imaging circuit.

The image processing section 202 receives an image signal from the imaging section 201. The image processing section 202 includes an A/D conversion circuit for converting the image signal into digital image data and applying color processing (e.g., white balance) to the converted image data.

The image compression section 203 can compress still image data into JPEG data. Furthermore, the image compression section 203 can compress moving image data into motion JPEG data or MPEG4 data.

The image storage section 204 is a nonvolatile memory capable of storing, as a file, the image data compressed by the image compression section 203. The image storage section 204 directly stores RAW format image data which are digital image data not subjected to the color processing and the compression processing in the image processing section 202.

The finder display section 206 can display an image captured by the imaging section 201 and an operation GUI. The operation switch section 207 is an operation member including a release switch that enables a user to perform various setting operations including change of image quality.

The external interface 208, matching a universal serial bus (USB) 230, can control exchange of image data, operation command or electric power between the digital camera 100 and an external apparatus.

The control section 209 controls various processing of the digital camera, including zoom, focus, and exposure controls as well as image processing and image compression processing, based on operation commands entered from the operation switch 207 or an external device. The control section 209 includes a read only memory (ROM) storing a control program, a random access memory (RAM) serving as a work area to which the control program is loaded, and a central processing unit (CPU) executing various controls based on the control program.

The flash unit 210 can emit light during a shooting operation of a still image according to settings of the operation switch section 207.

The setting storage section 205 is a nonvolatile memory capable of storing setting values of various parameters that may be set by a user through the operation switch section 207 or determined depending on an operation command supplied from the adapter 101. The setting storage section 205 can store an identifier (ID) used for discriminating the type of the digital camera 100. When the digital camera 100 is attached (i.e., mounted) on the adapter 101, the control section 209 transfers ID (i.e., type) information of the digital camera 100 to the adapter 101.

The adapter 101 includes a pan-tilt driving section 222, a panhead control section 221, a control section 223 (i.e., a main control section), an external interface 224, a network interface 225, an image storage section 226, a sensor input section 227, and a data storage section 228.

The pan-tilt driving section 222 is a pan-tilt driving mechanism for the digital camera 100. The panhead control section 221 includes a circuit for performing a drive control of the pan-tilt driving section 222 according to an external operation command.

The control section 223 performs an overall control of the adapter 101. The control section 223 includes a ROM storing a control program, a RAM serving as a work area used for loading the read control program, and a CPU executing various controls based on the control program.

The external interface 224 can receive image data from the digital camera 100. Furthermore, the external interface 224 can control electric power supply to the digital camera 100 and output an operation command to control the digital camera 100 via the USB 230.

The adapter 101 not only includes a mounting mechanism for the digital camera 100 but also provides an electrical path via the USB 230 to the digital camera 100. The adapter 101 can check electric characteristics of the USB 230 to determine whether the digital camera 100 is attached on the adapter 101. The USB 230 can be replaced with IEEE1394 or other medium that enables the adapter 101 to exchange data and control signals with an external device.

The network interface 225 can control exchange of control commands between the adapter 101 and the output apparatus 102. The network interface 225 can receive a control command sent via the network 104 from the output apparatus 102.

The image storage section 226 is a mass storage device (e.g., a hard disk) that can store image data captured by the digital camera 100. The sensor input section 227 includes a circuit that can detect a signal sent from a sensor for human detection or other external sensor.

The system described in the first exemplary embodiment uses TCP/IP (UDP/IP) protocol for communication through the network 104. Each of the adapter 101 and the output apparatus 102 is allocated individual IP address. A cable connection or a wireless connection can be provided as a physical connection between the output apparatus 101 and the network.

Figure 11:
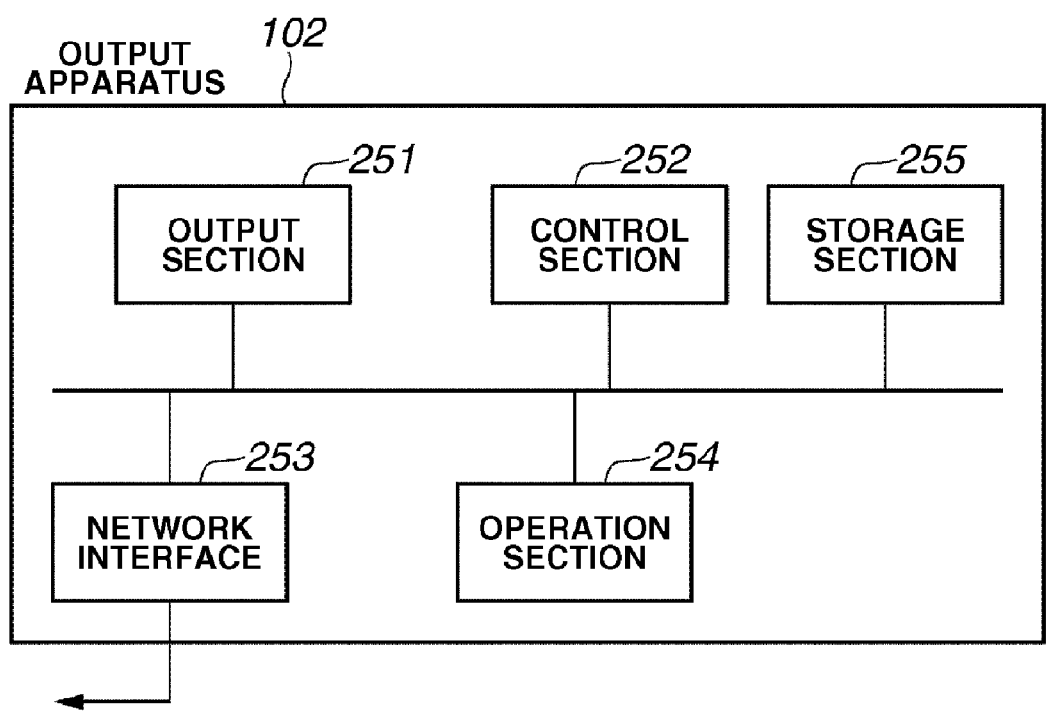
FIG. 11 is a block diagram illustrating an exemplary output apparatus according to an embodiment of the present invention.

FIG. 11 is a block diagram illustrating the output apparatus 102 according to an embodiment. In FIG. 11, an output section 251 can execute processing for displaying or printing image data obtained from the adapter 101. When the output apparatus 102 is a display apparatus, the output section 251 can include a display device. When the output apparatus 102 is a printing apparatus, the output section 251 can include a printing mechanism.

A control section 252 can control the output apparatus 102. The control section 252 includes a ROM storing a control program, a RAM serving as a work area to which the control program is loaded, and a CPU executing various controls based on the control program.

A network interface 253 can output a command to the adapter 101 and receive image data from the adapter 101 via the network 104. An operation section 254 includes operation members enabling a user to perform various input operations and a detection circuit detecting input operations.

A storage section 255 is a memory that can store the image data transferred from the adapter 101 and a table shown in FIG. 17.

Next, an image format of the digital camera 100 is described in detail.

The digital camera 100 captures a still image. The image storage section 204 stores still image data as raw image data (i.e., image data not subjected to any color processing and compression processing) or as JPEG image data (i.e., image data subjected to various color processing and compression processing).

An electric signal obtained from the imaging section 201 can be simply digitized and stored as a file of RAW format image data into the image storage section 204. RAW format image data is generally 12-bit data, although the data length is dependent on the digital camera 100. There is no standard format applied to RAW format image data because of their nature (because RAW format image data is simply digitized from an image obtained from the imaging section 201). In other words, RAW format image data is different depending on individual manufacturer of the digital camera.

RAW format image data can maintain higher quality in the color processing and possess higher flexibility in the adjustment of contrast and sharpness.

However, RAW format image data has a larger data size compared to JPEG image data subjected to compression processing. The storage processing, backup processing, and transfer processing applied to RAW format image data requires a significant long time.

The output apparatus 102 cannot display an image of RAW format image data because image processing (e.g., white balance and color processing) is not yet applied to the raw image data. In general, development processing for changing RAW format image data into a format enabling the output apparatus 102 to display visible image data, requires dedicated software. A user is required to have sufficient knowledge and know-how to handle the software. In the first exemplary embodiment, the digital camera 100 can execute the processing for developing RAW format image data stored in the image storage section 204.

The development processing of RAW format image data is different depending on individual camera manufacturer.

On the other hand, an image signal obtained from an image pickup element can be digitized and formatted as a file of JPEG image data through color processing (e.g., white balance) and compression processing. JPEG image data is generally 8-bit data easy to handle. However, if JPEG image data is further subjected to color processing using photo retouch software, the image quality of JPEG image will deteriorate because of insufficient data amount.

Next, processing applied to RAW format image data according to the first exemplary embodiment is described.

In the first exemplary embodiment, the digital camera 100 includes the image processing section 202 and the image compression section 203 to apply development processing to RAW format image data.

First, settings of development parameters processed by the image processing section 202 in the digital camera 100, and development processing will be described. The development processing in the first exemplary embodiment is processing for converting RAW format image data into visible image data, which is performed by the image processing section 202 and the image compression section 203.

A plurality of sets of development parameters can be prepared by the output apparatus 102 connected to the adapter 101. The data storage section 228 in the adapter 101 stores the plurality of sets of development parameters.

Each output apparatus 102 may be able to store development parameters. However, development parameters are different in type and value depending on individual camera manufacturer just as the RAW image data format. Therefore, each output apparatus 102 is required to manage the plurality of sets of development parameters corresponding to a type of the RAW format of respective camera manufacturers. Such a management is difficult to realize.

When the output apparatus 102 is determined as a transfer destination of image data, the adapter 101 reads development parameter setting values applied to the output apparatus 102 (i.e., transfer destination) from the data storage section 228. The adapter 101 transfers the read development parameter setting values to the digital camera 100 via the external interface 224. If the data storage section 228 stores no development parameter setting values applied to the connected output apparatus 102, the adapter 101 transfers predetermined standard development parameter setting values to the digital camera 100.

The digital camera 100 receives the transferred development parameter setting values via the external interface 208 and sets the received development parameter setting values to the image processing section 202 and the image compression section 203.

In the digital camera 100, the image processing section 202 and the image compression section 203 execute development processing based on the received development parameter setting values.

The digital camera 100 transfers, via the external interface 208, visible image data obtained through the development processing to the adapter 101. The adapter 101 sends the visible image data to the output apparatus 102 (i.e., transfer destination).

FIG. 12 illustrates development parameters according to an exemplary embodiment, i.e., an exemplary definition of development parameters corresponding to a model of the digital camera 100. The setting value of each parameter can be set within a defined parameter range. The parameter range is defined according to the type of the digital camera 100. FIG. 14 illustrates an exemplary definition of development parameters corresponding to another model of the digital camera 100.

The development parameters can be classified into file-related parameters and image quality adjustment-related parameters.

The file-related parameters include "pixel number", "compression rate", and "file format." The "pixel number" parameter includes L, M1, M2, and S sizes (i.e., fixed values) and a user-defined size (pixel/inch). The "compression rate" parameter (i.e., a compression rate used in the compressing of JPEG image data) includes "super fine", "fine", and "normal" (i.e., fixed values) and a user-defined numerical value. The "file format" parameter is selectable between JPEG and TIFF. In general, the image data is converted into a JPEG format when the image data is displayed on a display screen of a display apparatus (i.e., output apparatus) or output as a print image from a printing apparatus (i.e., output apparatus).

The image quality adjustment-related parameters include "color effect", "white balance", "digital exposure correction (exposure compensation)", and "color space designation."

The "color effect" parameter includes "off", "vivid color", "neutral color", "soft", "sepia", "black/white", "white skin", "brown skin", "cool", "warm", "posifilm" (i.e., fixed setting values) and "custom" (user-defined setting values). The custom setting includes "contrast", "sharpness", and "color depth" that enables a user to individually adjust the degree of brightness, vividness of contour, depth of color.

The "white balance" parameter includes "auto", "sunlight", "cloudy", "electric bulb", "fluorescent", "fluorescent H", "flash", "underwater", "custom", and "white color point designation." The custom setting allows a user to individually determine the tint in the range from magenta to green.

The "digital exposure correction" parameter can be set by a numerical value.

The "color space designation" parameter is selectable between adobeRGB and sRGB. The color space is determined for each output apparatus, such as a display apparatus or a printing apparatus. The "color space designation" parameter is used to designate the color space.

In the adapter 101, the above-mentioned development parameters are set for each type of the output apparatus 102. FIG. 13 illustrates an exemplary set of development parameter setting values (referred to as set "A") corresponding to each type of the output apparatus 102, which is stored in the data storage section 228. The set "A" shown in FIG. 13 corresponds to the definition of parameters shown in FIG. 12. Namely, FIG. 13 shows the set "A" corresponding to the type of the digital camera 100 attached on the adapter 101. Similarly, FIG. 15 illustrates an exemplary set of development parameter setting values (referred to as set "B") corresponding to the definition of parameters shown in FIG. 14.

FIG. 16 illustrates an exemplary table stored in the data storage section 228. The table shown in FIG. 16 shows a relationship between an identifier (ID) of the attached digital camera 100 and a corresponding set of development parameter setting values. With reference to the table, the adapter 101 can determine a set of development parameter setting values processible in the attached digital camera 100.

For example, setting values for a liquid crystal display apparatus can be determined considering the characteristics (e.g., higher brightness and weak contrast). With respect to the file-related parameters, the "pixel number" parameter can be set to M1 size matching with a pixel number of the liquid crystal display apparatus. The "compression rate" parameter can be set to "fine." The file format is JPEG. With respect to the image quality adjustment-related parameters, the "color effect" can be set to "custom" to select weak contrast, strong sharpness, and thick color considering the characteristics of thin color expression by a liquid crystal display apparatus.

Furthermore, the "white balance" parameter can be set to −30. The "digital exposure correction" parameter can be set to −1.5. And, the "color space designation" parameter can be set to sRGB displayable by the output apparatus.

Similarly, setting values for a cathode ray tube display apparatus can be determined considering the characteristics. With respect to the file-related parameters, the "pixel number" parameter can be set to S size because the total number of displayable pixels is small. The "compression rate" parameter can be set to "normal." Other setting parameters can be set to standard values.

Moreover, setting values for a plasma display apparatus can be determined in the following manner. With respect to the file-related parameters, the "pixel number" parameter can be set to M1 size. The "compression rate" parameter can be set to "fine." With respect to the image quality adjustment-related parameters, the "color effect" can be set to "custom" to select strong contrast, strong sharpness, and standard color depth considering the characteristics that the contrast and sharpness expression by a plasma display apparatus is excellent.

Additionally, setting values for a printing apparatus can be determined considering the higher image expressivity. The "pixel number" parameter can be set to L size. The "compression rate" parameter can be set to "super fine." The "color space designation" parameter can be set to adobeRGB having a larger space.

Yet further, setting values for an external image server can be determined considering easiness in transferring image data via the Internet. More specifically, each setting value of the development parameter can be set to a small data amount when transmitted as development parameters.

Each manufacturer of the output apparatus 102 can prepare the afore-mentioned settings within the range of the development parameters of the attached digital camera 100, considering the characteristics of the digital camera 100. Furthermore, a user can change the setting values within the range of parameters of the attached digital camera 100.

Although FIG. 13 shows a single set of exemplary settings for each output apparatus 102, two or more sets of exemplary settings can be prepared for each output apparatus 102 so that a user can select a desirable one when image data is transferred to the output apparatus 102.

As described above, the present exemplary embodiment sets development parameter setting values considering the type of the digital camera 100 as well as the type of the output apparatus 102. Thus, the digital camera 100 can perform development processing so as to match the characteristics of the output apparatus 102 and user's preference. Furthermore, the adapter 101 can store the development parameter setting values and can set to digital camera 100, development parameters corresponding to the output apparatus 102.

Accordingly, a user is not required to repeatedly perform settings of development parameter setting values each time the type of the apparatus digital camera 100 is changed or the output apparatus 102 (i.e., transfer destination of image data) is changed. Thus, usability of the system can be greatly improved.

The output apparatus 102 may possess compatibility to a color management using an international color consortium (ICC) profile. As one method, the adapter 101 may perform color management processing for the output apparatus 102. Alternatively, the output apparatus 102 may perform color management processing. The development processing according to the first exemplary embodiment precedes the color management processing. Therefore, the present exemplary embodiment performs the development processing so that a sufficient amount of information (e.g., the size of color space) can be used for the succeeding color management processing.

Figure 3:
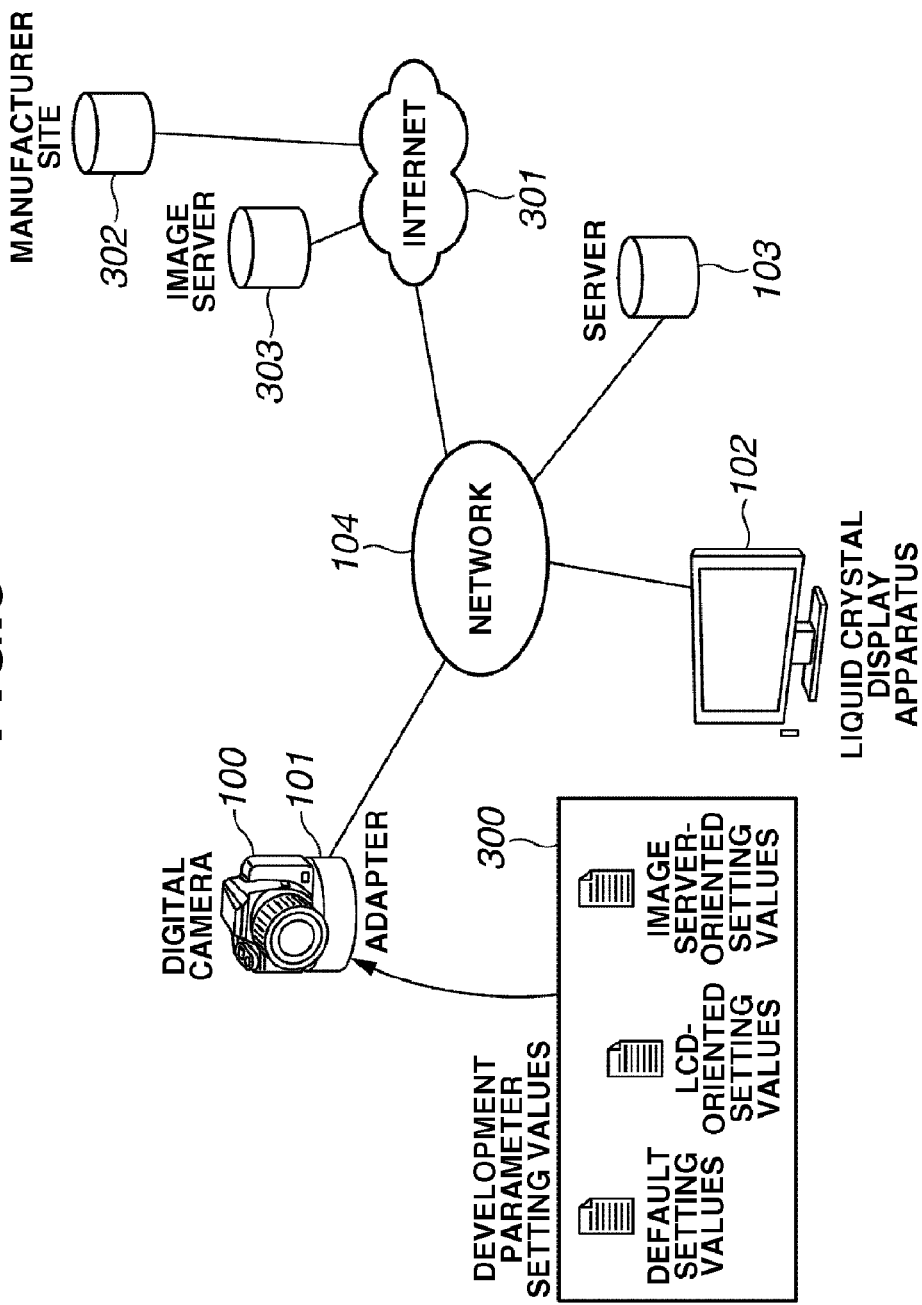
FIG. 3 is a system arrangement according to an exemplary embodiment.

FIG. 3 illustrates an exemplary system enabling the output apparatus 102 to display RAW format image data stored in the image storage section 204 of the digital camera 100. As shown in FIG. 3, in an embodiment, the output apparatus 102 is a liquid crystal display apparatus.

The liquid crystal display apparatus 102 can display a user interface on its screen to let a user designate the adapter 101. When instructed by a user, the liquid crystal display apparatus 102 can access the designated adapter 101. When a communication path is established between the liquid crystal display apparatus 102 and the adapter 101, the liquid crystal display apparatus 102 and the adapter 101 can exchange device information (i.e., detailed information about each device).

In the adapter 101, the control section 223 reads LCD (i.e., liquid crystal display apparatus)-oriented development parameter setting values 300 from the setting storage section 205 and sets the LCD-oriented development parameter setting values to the digital camera 100. Then, the liquid crystal display apparatus 102 transmits to the adapter 101 a request command for obtaining image data from the digital camera 100. Then, the adapter 101 analyzes the request command and determines whether the request command is a command requesting RAW format image data stored in the image storage section 204 of the digital camera 100.

If the request command is a command requesting RAW format image data, the adapter 101 transmits the request command to the digital camera 100. In the digital camera 100, the control section 209 reads the requested RAW format image data from the image storage section 204. Then, the control section 209 controls the image processing section 202 and the image compression section 203 to apply development processing to the target raw image data based on the development parameters obtained from the adapter 101.

Then, the digital camera 100 transfers visible image data obtained through the development processing via the adapter 101 to the liquid crystal display apparatus 102. The liquid crystal display apparatus 102 displays an image on a display screen based on the visible image data.

If the adapter 101 stores no development parameter setting values of the corresponding output apparatus, the adapter 101 downloads development parameter setting values via the Internet from the manufacturer site (server) 302 of the output apparatus.

Next, the processing for transferring RAW format image data from the image storage section 204 of the digital camera 100 to the liquid crystal display apparatus is described with reference to flowcharts of FIGS. 4 and 5.

Figure 4:
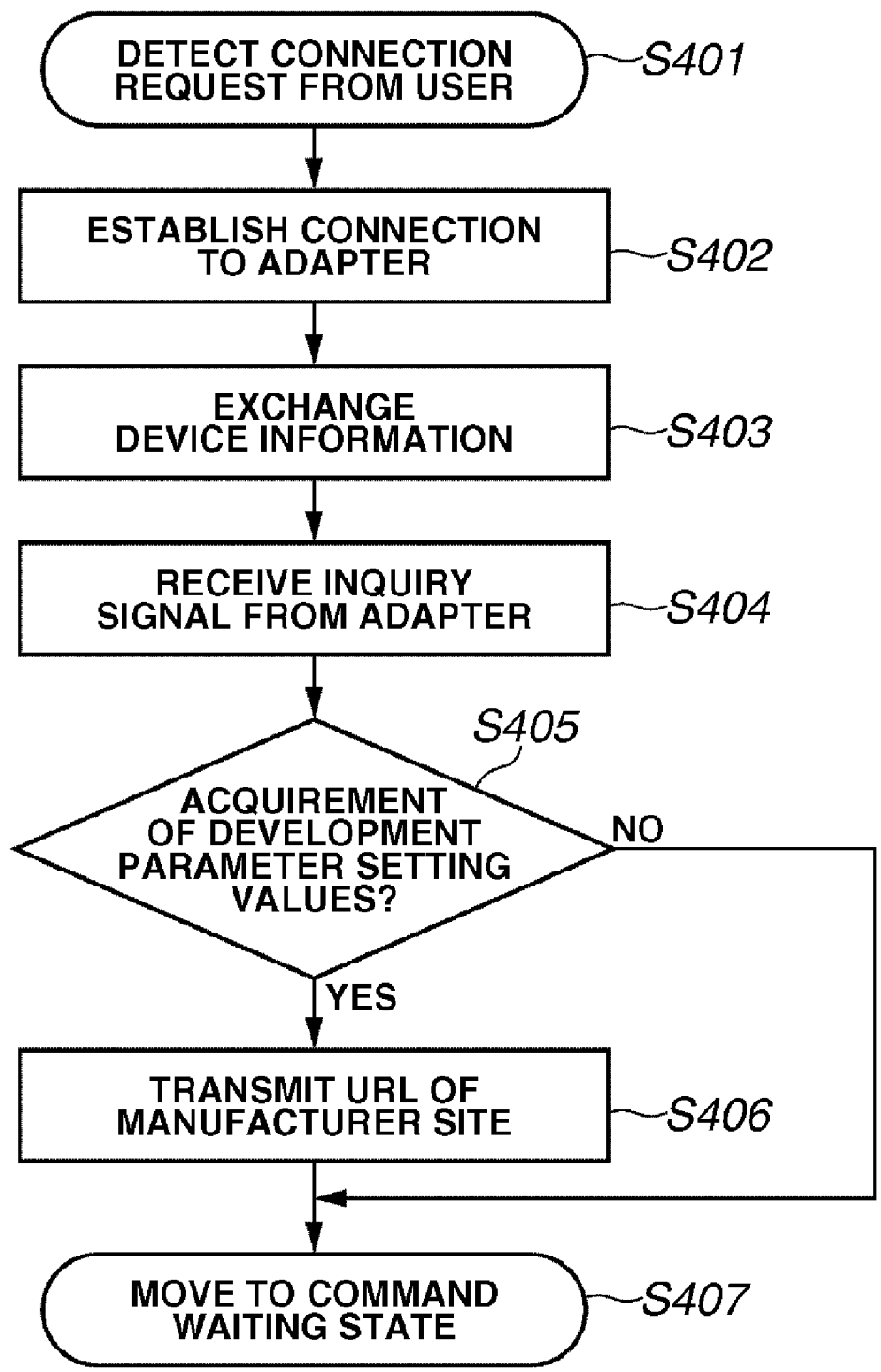
FIG. 4 is a flowchart illustrating exemplary processing performed by a liquid crystal display apparatus according to an embodiment of the present invention.

FIG. 4 is a flowchart illustrating exemplary processing performed by the liquid crystal display apparatus 102 according to an embodiment of the present invention.

The control section 252 of the liquid crystal display apparatus 102 detects a connection request entered based on a user's operation. In response to the detection, the control section 252 sends a connection request to the adapter 101 (refer to step S401).

When a communication path is established between the liquid crystal display apparatus 102 and the adapter 101 (refer to step S402), the control section 252 transmits its own device information (including device type information) to the adapter 101. Furthermore, the control section 252 obtains device information of the adapter 101 and identifier (ID) information of the digital camera attached on the adapter 101 (refer to step S403). In an embodiment, the device information includes a device name and device functions.

Next, the control section 252 receives, from the adapter 101 via the network interface 253, an inquiry signal determining whether to obtain development parameter setting values corresponding to the liquid crystal display apparatus 102 from an external device (refer to step S404).

The control section 252 causes the output section 251 to display a GUI on a display screen to let a user determine whether the development parameter setting values are required (refer to step S405).

If a user inputs a command requiring no development parameter setting values (i.e., NO in step S405), the control section 252 waits for a new command (refer to step S407).

On the other hand, if a user inputs a command requiring development parameter setting values (i.e., YES in step S405), the processing flow proceeds to step S406. The control section 252 transmits, to the adapter 101, URL information indicating a storage destination of the development parameter setting values stored in a server 302 of a manufacturer site of the liquid crystal display apparatus 102 (refer to step S406).

The URL information includes a storage destination server of the development parameter setting values corresponding to identifier (ID) information of the digital camera attached on the adapter 101 extracted from the information obtained in step S403. The control section 252 can obtain the URL with reference to a table shown in FIG. 17.

After completing the processing of step S406, the liquid crystal display apparatus 102 goes into a command waiting state (refer to step S407).

Figure 5:
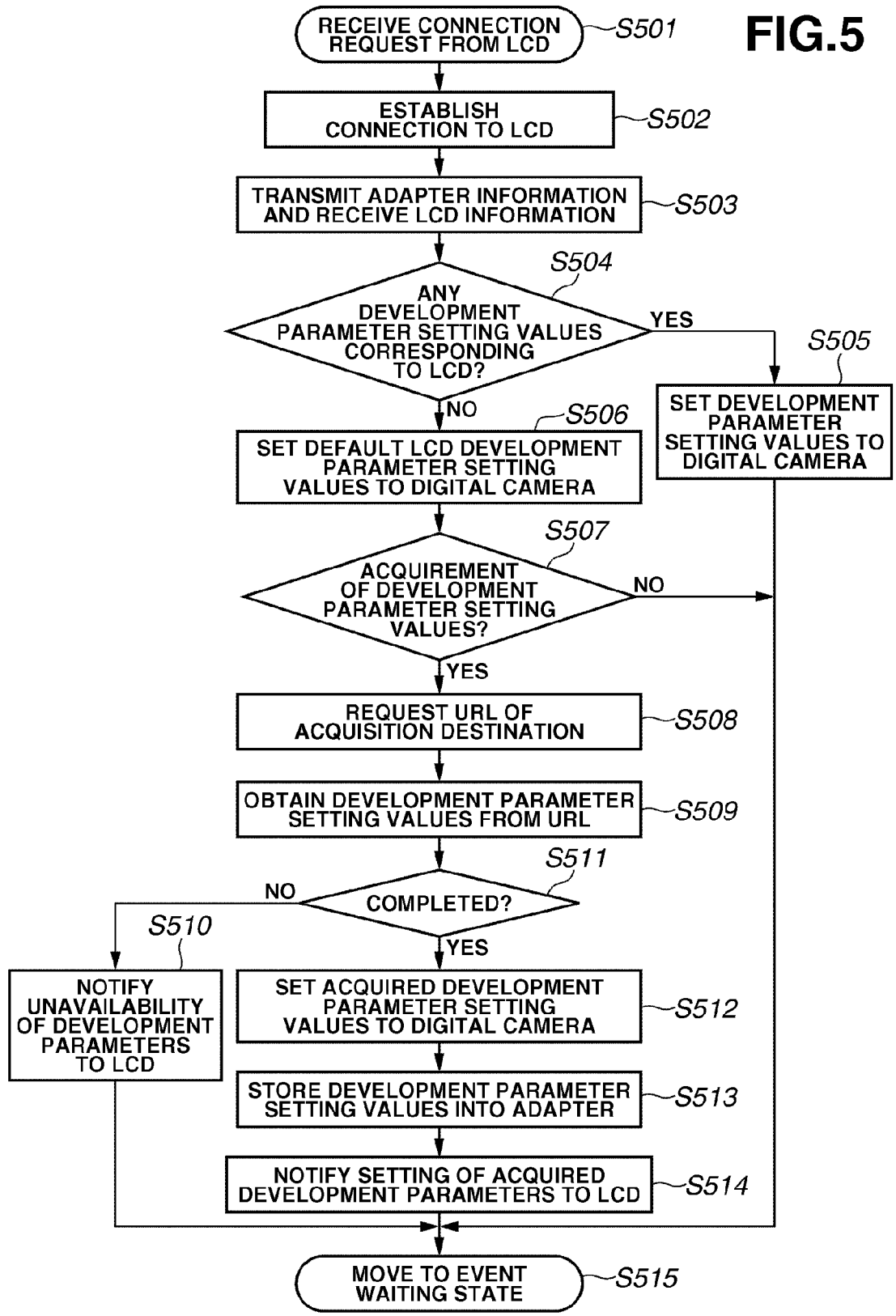
FIG. 5 is a flowchart illustrating exemplary processing performed by the adapter according to an embodiment of the present invention.

FIG. 5 is a flowchart illustrating exemplary processing performed by the adapter 101 according to an embodiment of the present invention. For the processing of FIG. 5, in an embodiment, the control section 223 executes a control program loaded from ROM to RAM. The adapter 101 obtains identifier (ID) information stored in the setting storage section 205 of the digital camera 100 via the USB 230 and stores the ID information in the data storage section 228 before starting the processing shown in FIG. 5. In this case, the adapter 101 can obtain the identifier (ID) information of the digital camera 100 with reference to attribute information of image data stored in the image storage section 204.

First, the control section 223 of the adapter 101 receives a connection request via the network interface 225 from the liquid crystal display apparatus 102 (refer to step S501).

In response to reception of the connection request, the control section 223 establishes a communication path to the liquid crystal display apparatus 102 (refer to step S502).

The control section 223 transmits its own device information and the ID information of the digital camera 100 (obtained beforehand) to the liquid crystal display apparatus 102. The control section 223 requests the liquid crystal display apparatus 102 to transmit device information (including device type information). Thus, the adapter 101 and the liquid crystal display apparatus 102 can exchange their device information (refer to step S503).

The control section 223 obtains a device name (or type information) of the liquid crystal display apparatus 102 from the received device information of the liquid crystal display apparatus 102. Then, the control section 223 retrieves development parameters corresponding to the obtained device name from the data storage section 228 (refer to step S504).

More specifically, the control section 223 selects a set of development parameter setting values corresponding to the identifier of the mounted digital camera 100 with reference to the table shown in FIG. 16. Then, the control section 223 determines development parameter setting values corresponding to the liquid crystal display apparatus 102 with reference to the selected set of development parameter setting values.

If the data storage section 228 stores the development parameter setting values corresponding to the liquid crystal display apparatus 102 (i.e., YES in step S504), the control section 223 instructs the digital camera 100 to set the identified development parameter setting values (refer to step S505).

After the digital camera 100 completes setting of the development parameter setting values corresponding to the liquid crystal display apparatus 102, the adapter 101 goes into an event waiting state (refer to step S515).

If the data storage section 228 stores no development parameter setting values corresponding to the liquid crystal display apparatus 102 (i.e., NO in step S504), the digital camera 100 receives from the control section 223, standard development parameter setting values applicable to the liquid crystal display apparatus 102 (refer to step S506).

The standard development parameter setting values applicable to the liquid crystal display apparatus 102 are development parameter setting values determined considering the characteristics of a standard liquid crystal display apparatus (hereinafter, refer to as "standard LCD-oriented development parameter setting values"). Therefore, the standard development parameter setting values cannot reflect characteristics of individual manufacturer or product or user's preference. Furthermore, the adapter 101 can store, in the data storage section 228, standard development parameter setting values applicable to the liquid crystal display apparatus 102 or other main output apparatus.

Next, the control section 223 notifies the liquid crystal display apparatus 102 of no availability of development parameter setting values corresponding to the liquid crystal display apparatus 102 and executing development processing using the standard LCD-oriented development parameter setting values. At the same time, the control section 223 sends an inquiry to the liquid crystal display apparatus 102 to determine whether to obtain development parameter setting values of the connected liquid crystal display apparatus 102 (refer to step S507).

If the operation section 254 of the liquid crystal display apparatus 102 receives a command requiring no acquisition of development parameter setting values (i.e., NO in step S507), the adapter 101 goes into an event waiting state (refer to step S515).

On the other hand, if the operation section 254 receives a command requiring acquisition of development parameter setting values (i.e., YES in step S507), the control section 223 of the adapter 101 requests the liquid crystal display apparatus 102 to transmit URL information indicating an address where development parameter setting values can be acquired (refer to step S508).

The control section 223 receives URL information indicating the address (i.e. web site) of development parameter setting values from the liquid crystal display apparatus 102. The control section 223 starts acquiring (downloading) development parameter setting values corresponding to the type of the connected liquid crystal display apparatus 102 and the type of the mounted digital camera 100 via the internet 301 from the site (server) 302 corresponding to the obtained URL (refer to step S509).

When a predetermined time has elapsed, the control section 223 determines whether acquisition of development parameter setting values is completed (refer to step S511). If downloading the development parameter setting values fails due to time-out (i.e., NO in step S511), the control section 223 notifies the liquid crystal display apparatus 102 of unavailability of development parameter setting values (refer to step S510). Then, the adapter 101 goes into an event waiting state (refer to step S515).

If acquisition of development parameter setting values is succeeded (i.e., YES in step S511), the control section 223 sends the acquired development parameter setting values to the digital camera 100 (refer to step S512). At the same time, the control section 223 stores the acquired development parameter setting values to the data storage section 228 (refer to step S513). Furthermore, the control section 223 notifies the liquid crystal display apparatus 102 of acquisition of development parameter setting values (refer to step S514). Then, the adapter 101 goes into an event waiting state (refer to step S515).

To temporarily set standard development parameter setting values corresponding to a standard liquid crystal display apparatus is useful if the adapter 101 requires a long time to complete acquiring development parameter setting values.

Figure 6:
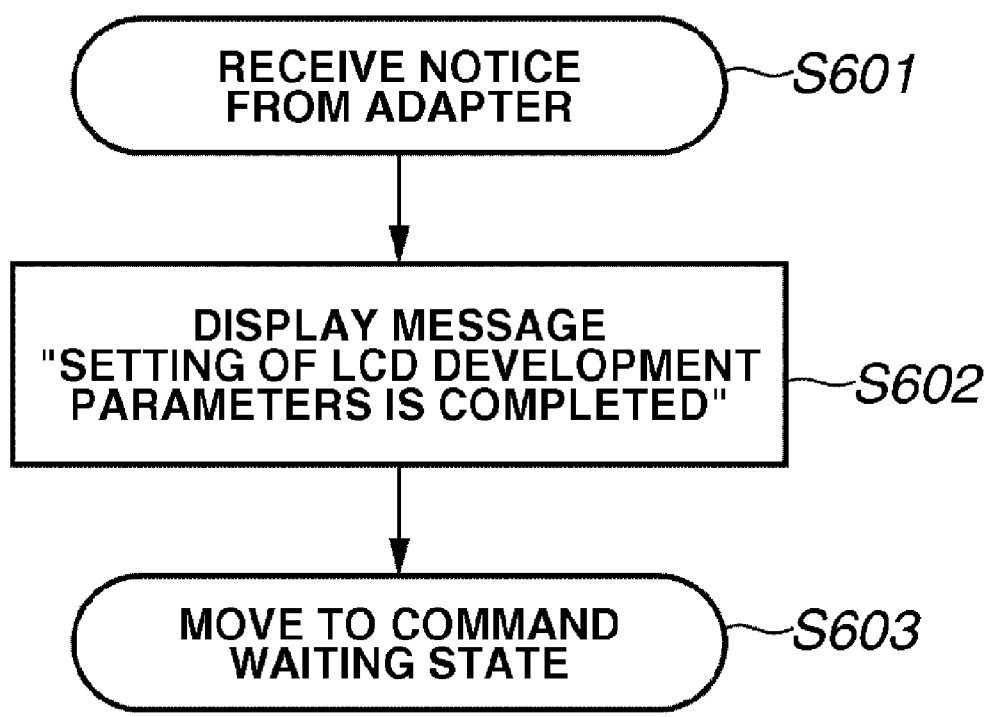
FIG. 6 is a flowchart illustrating exemplary processing performed by the liquid crystal display apparatus according to an embodiment of the present invention.

When the development parameter setting values obtained by the adapter 101 is set to the digital camera 100, the adapter 101 notifies the liquid crystal display apparatus 102 of completion of parameter settings. FIG. 6 is a flowchart illustrating exemplary processing performed by the liquid crystal display apparatus 102 in response to reception of the setting completion notice.

In FIG. 6, the liquid crystal display apparatus 102 causes the network interface 204 to receive a notice from the adapter 101 (refer to step S601) and causes the output section 251 to display a message "setting of LCD development parameters is completed" on its display screen (refer to step S602). Then, the liquid crystal display apparatus 102 goes into a command waiting state (refer to step S603).

Figure 7:
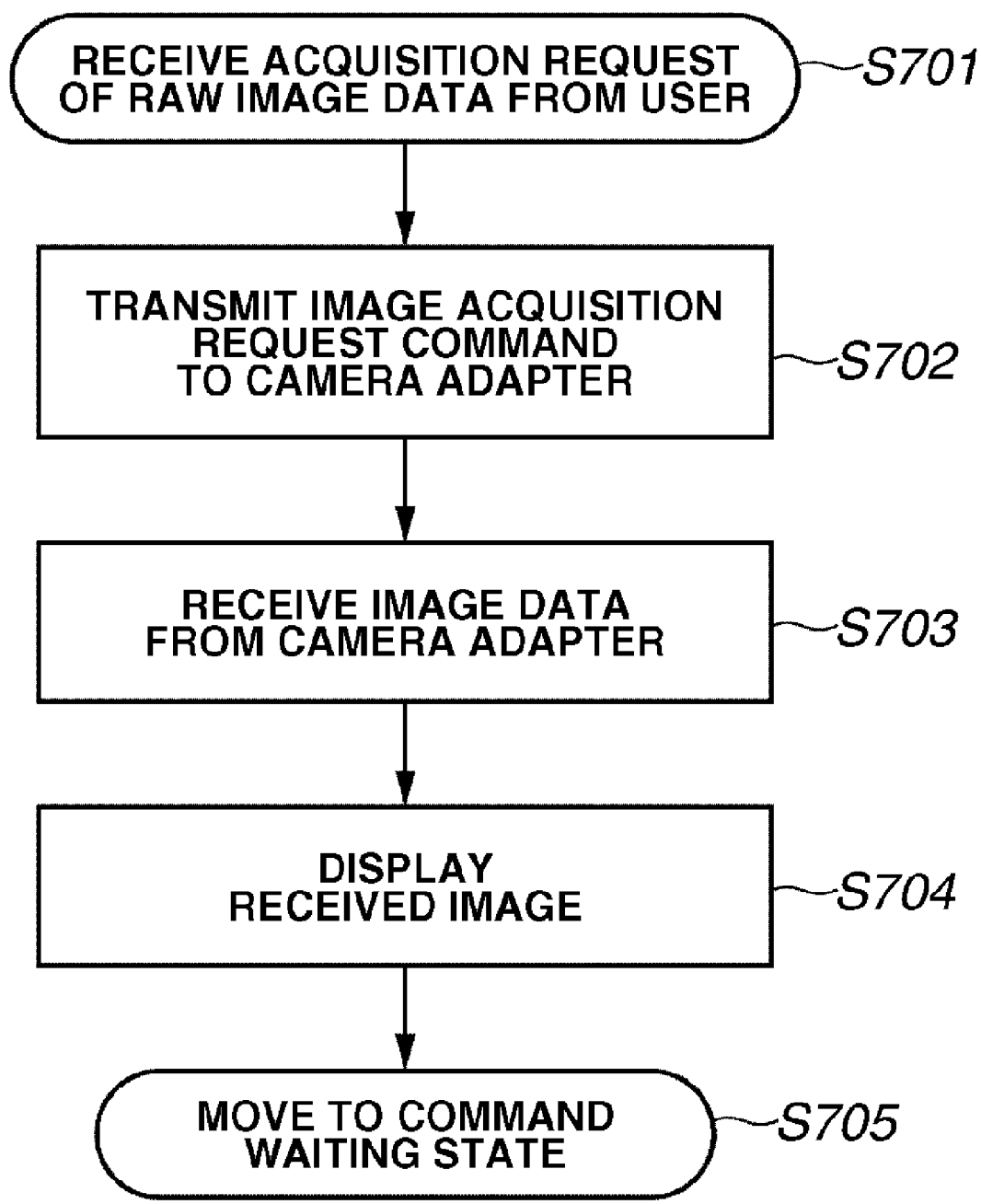
FIG. 7 is a flowchart illustrating exemplary processing performed by the liquid crystal display apparatus according to an embodiment of the present invention.

FIG. 7 is a flowchart illustrating exemplary processing performed by the liquid crystal display apparatus 102 that receives visible image data converted from RAW format image data based on development parameter setting values and displays the visible image data on its display screen.

The control section 252 receives a command entered from the operation section 254 based on a user's operation and determines whether the input command is an acquisition request of RAW format image data stored in the image storage section 204 of the digital camera 100 (refer to step S701). If it is determined that the input command is the acquisition request, the control section 252 transmits an image acquisition request command to the adapter 101 (refer to step S702).

In response to the command, the adapter 101 transmits visible image data (i.e., image data converted from RAW format image data) to the network interface 253 of the liquid crystal display apparatus 102 (refer to step S703). Then, the control section 252 causes the output section 251 to display an image based on received image data (refer to step S704). Then, the liquid crystal display apparatus 102 goes into a command waiting state (refer to step S705).

Thus, even if the requested image data is RAW format image data, a user can confirm the image on a display screen of the liquid crystal display apparatus 102 without requiring any special processing.

Figure 8:
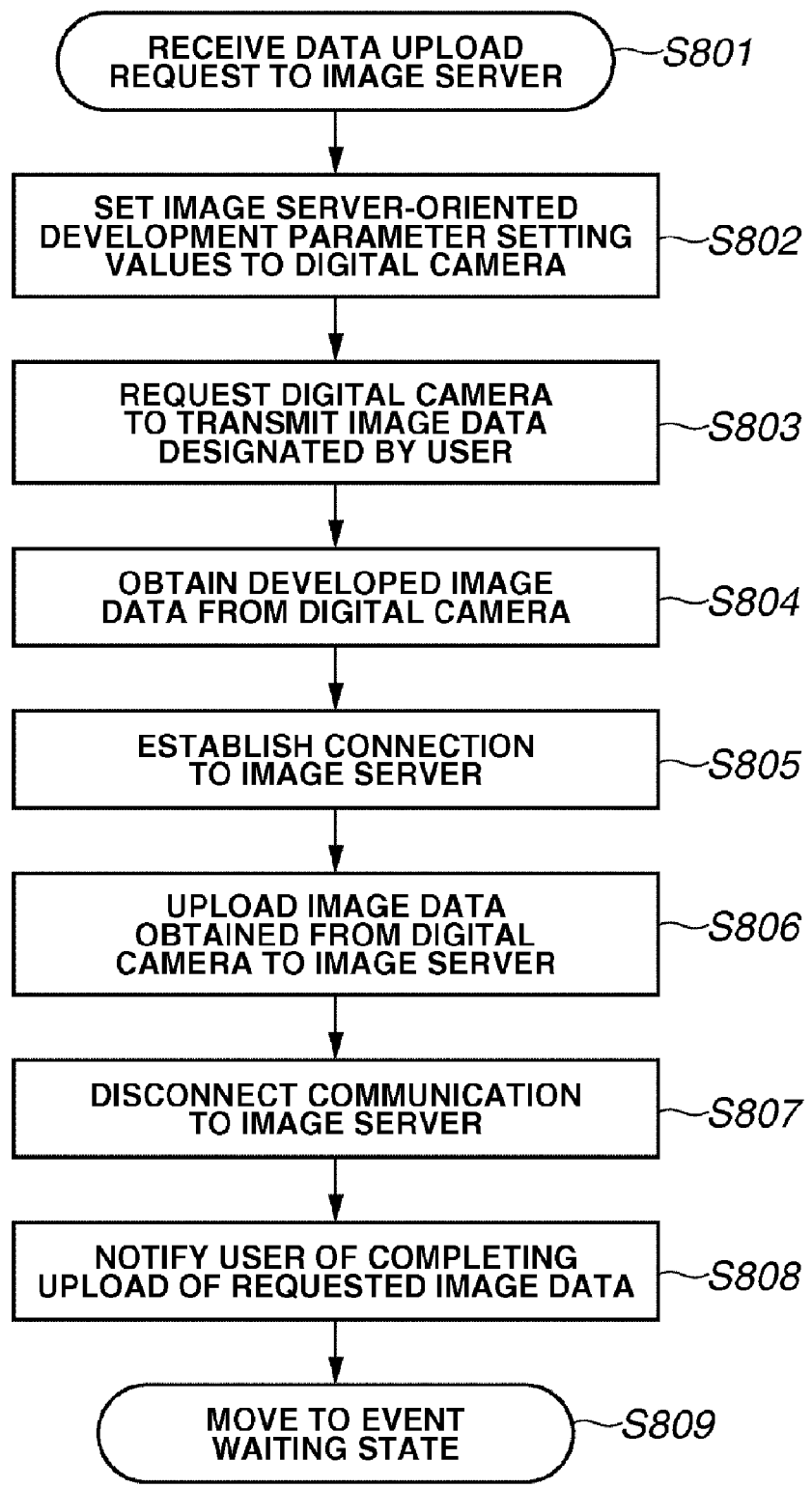
FIG. 8 is a flowchart illustrating exemplary processing performed by the adapter according to an embodiment of the present invention.

FIG. 8 is a flowchart illustrating processing performed by the adapter 101 that uploads RAW format image data from the image storage section 204 of the digital camera 100 to an external image server 303. In this case, a plurality of terminals (not shown) can access the raw image data uploaded to the external image server 303.

First, based on a command entered based on a user's operation, the output apparatus 102 requests the adapter 101 to transmit a list of image data stored in the image storage section 204 of the digital camera 100. The output apparatus 102 obtains the list of image data from the image storage section 204 and displays the list of image data on its display screen to let a user select an object (image data) to be uploaded. Then, the network interface 225 of the adapter 101 receives image data selected by a user from the output apparatus 102 (refer to step S801).

The control section 223 of the adapter 101 reads development parameter setting values applied to the image server 303 from the data storage section 228 and sets the development parameter setting values to the digital camera 100 (refer to step S802). Then, the control section 223 requests the digital camera 100 to send image data corresponding to the image data designated by a user (refer to step S803).

The control section 223 obtains visible image data developed for the image server 303 from the digital camera 100 (refer to step S804) and establishes a communication path to the image server 303 (refer to step S805).

When the communication path is established, the control section 223 starts uploading visible image data obtained from the digital camera 100 to the external image server 303 (refer to step S806).

When all of the visible image data requested by the output apparatus 102 is uploaded, the control section 223 disconnects the communication between the adapter 101 and the external image server 303 (refer to step S807).

The control section 223 notifies the output apparatus 102 of completion of uploading the requested image data (refer to step S808). Then, the adapter 101 goes into an event waiting state (refer to step S809).

If selection of images by a user is not required, all of captured images can be stored to the server 303. In this case, connecting the digital camera 100 to the adapter 101 can be used as a trigger signal. The adapter 101 sets image server-oriented development parameter setting values to the digital camera 100. The adapter 101 uploads the visible image data developed by the digital camera 100 to the server 303. Through the above-mentioned processing automatically performed by the adapter 101, image data can be easily stored to the server 303 without requiring any special user's operation.

The system according to the first exemplary embodiment executes development processing of RAW format image data set in the image storage section 204 of the digital camera 100.

However, the processing of the first exemplary embodiment can be applied to external raw image data of the same format if the external RAW format image data can be transferred via the adapter 101 to the image storage section 204 of the digital camera 100. In short, the RAW format image data according to the first exemplary embodiment is not limited to the raw image data set in the digital camera 100 and includes raw image data in the adapter 100 or in a network server.

The system according to the first exemplary embodiment can perform development processing considering the characteristics of a connected output apparatus and user's preference without relying on a personal computer.

The system according to the first exemplary embodiment can easily apply development processing to RAW format image data so as to match the characteristics of a connected output apparatus.

Second Exemplary Embodiment

In the second exemplary embodiment, a digital camera (i.e., image pickup apparatus) is directly connected to the network without any intervening adapter.

Figure 9:
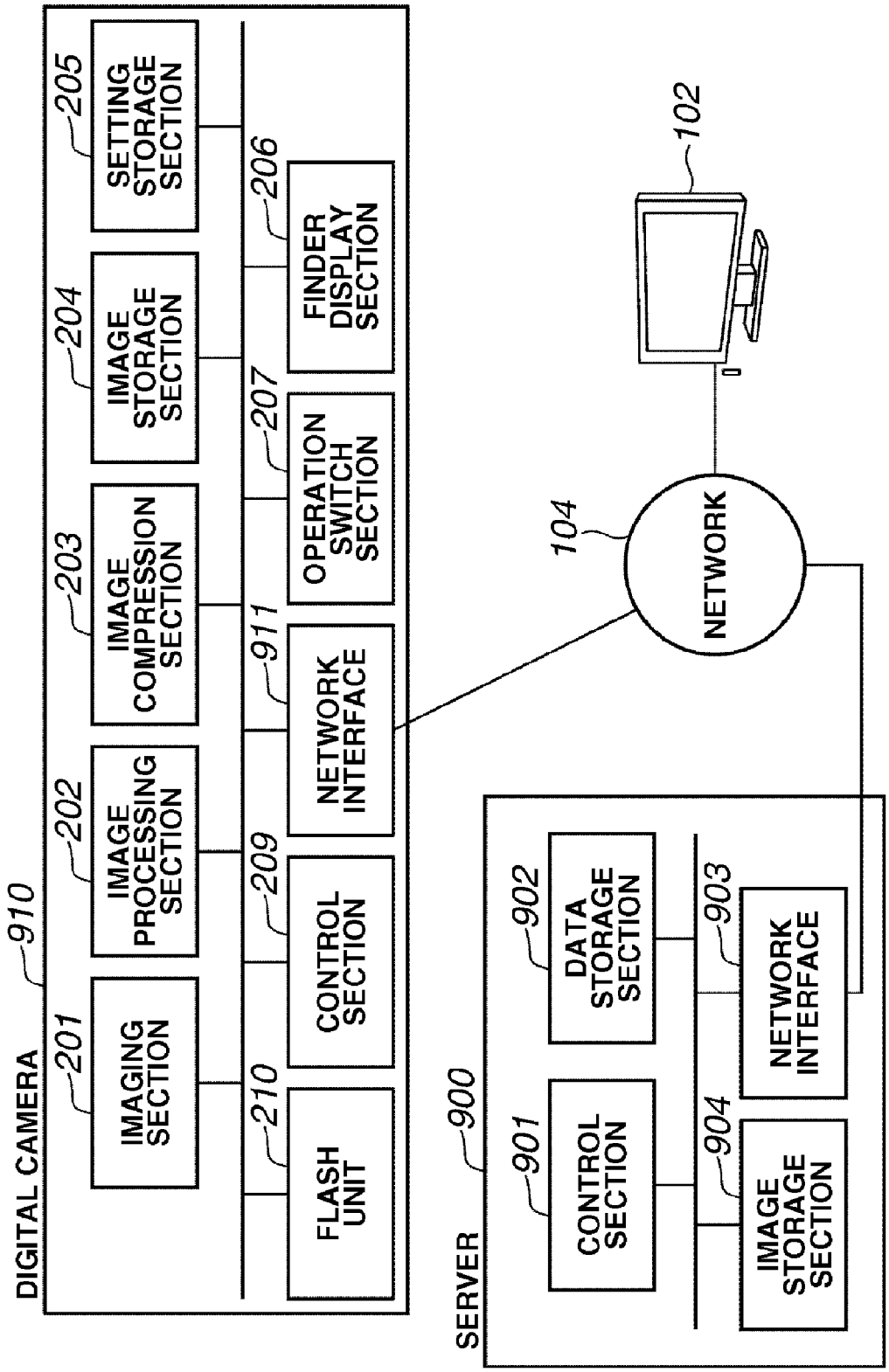
FIG. 9 is a system arrangement according to a second exemplary embodiment.

FIG. 9 is a system arrangement according to a second exemplary embodiment. The system shown in FIG. 9 includes a digital camera 910, a server 900, and the output apparatus 102 which are connected via the network 104.

The digital camera 910 is different from the above-described digital camera 100 in that a network interface 911 for network connection is provided instead of using the external interface 208. The control section 209 can execute a control for communicating with a network device. In the rest of arrangement, the digital camera 910 is similar to the digital camera 100 of the first exemplary embodiment. Therefore, a description is not repeated.

The server 900 includes a control section 901, a data storage section 902, a network interface 903, and an image storage section 904.

The control section 901 performs an overall control of the server 900. The control section 901 includes a ROM storing a control program, a RAM serving as a work area to which the control program is loaded, and a CPU executing various controls based on the control program.

The data storage section 902 is a nonvolatile memory capable of storing various data including the sets of development parameter setting values shown in FIGS. 13 and 15 and the table shown in FIG. 16. The network interface 903 can control transmission/reception of operation commands and image data exchanged via the network between the server 900 and the digital camera 910 or the output apparatus 102.

The image storage section 904 is a mass storage memory (e.g., a hard disk) capable of storing image data captured by the digital camera 910. The image storage section 904 can be similar to the data storage section 902 in physical configuration. The output apparatus 102 is, for example, a liquid crystal display apparatus operable as a network device.

Next, processing for acquiring RAW format image data from the image storage section 204 of the digital camera 910 and displaying the acquired image data on a display screen of the output apparatus 102 is described.

To display RAW format image data on the output apparatus 102, setting of development parameters and development processing based on the setting values are required.

In the second exemplary embodiment, the data storage section 902 of the server 900 stores the setting values of development processing parameters. Similar to the first exemplary embodiment, the development processing parameters stored in the data storage section 902 are classified into pre-defined types as shown in FIG. 12 and have setting values determined according to the type of each output apparatus as shown in FIG. 13.

First, in response to a command entered based on a user's operation, the output apparatus 102 and the digital camera 910 are connected via the network 104.

After the communication path is established, the output apparatus 102 and the digital camera 910 exchange their device information.

Next, the digital camera 910 obtains development parameter setting values stored in the data storage section 902 of the server 900.

When an acquisition request for acquiring image data in digital camera 910 is transmitted from the output apparatus 102 to the digital camera 910 according to a command entered based on a user's operation, the digital camera 910 starts developing the designated RAW format image data (i.e., acquisition request object). Then, visible image data obtained through the development processing is transferred via the network 104 to the output apparatus 102.

Figure 10:
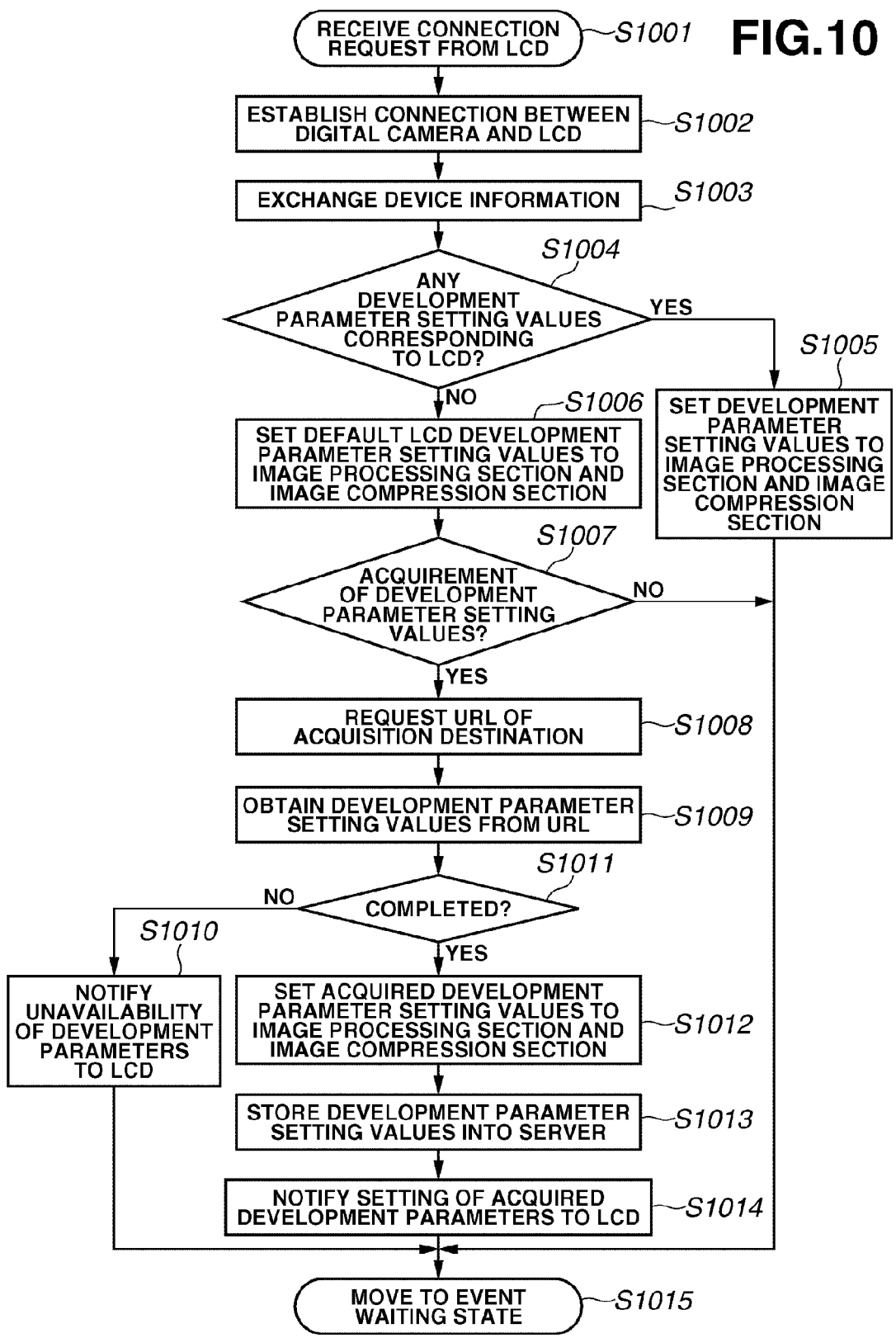
FIG. 10 is a flowchart illustrating exemplary processing performed by the digital camera according to an embodiment of the present invention.

FIG. 10 is a flowchart illustrating exemplary processing performed by the digital camera 910 that receives a connection request from the output apparatus 102 and sets development parameter setting values. In the processing of FIG. 10, the output apparatus 102 is a liquid crystal display apparatus.

First, the network interface 911 of the digital camera 910 receives a connection request from the liquid crystal display apparatus 102 (refer to step S1001). In response to reception of the connection request, the control section 209 establishes a communication path to the liquid crystal display apparatus 102 (refer to step S1002).

Next, the control section 209 of the digital camera 910 transmits its own device information (including its own identifier information) and requests the liquid crystal display apparatus 102 to transmit device information (including device type information). Thus, the adapter 101 and the liquid crystal display apparatus 102 can exchange their device information (refer to step S503).

The control section 209 of the digital camera 910 transfers a request command together with the identifier information of the digital camera 910 to the server 900. The request command transferred to the server 900 includes an inquiry whether the data storage section 902 stores development parameter setting values corresponding to the liquid crystal display apparatus 102, with reference to the device information received from the liquid crystal display apparatus 102 (refer to step S1004).

If the data storage section 902 of the server 900 stores the corresponding development parameter setting values, the control section 209 obtains the development parameter setting values from the data storage section 902. Then, the control section 209 sets the development parameter setting values to the image processing section 202 and the image compression section 203 (refer to step S1005). After completing the setting processing, the digital camera 910 goes into an event waiting state (refer to step S1015).

If the data storage section 902 of the server 900 stores no corresponding development parameter setting values (i.e., NO in step S1004), the control section 209 obtains from the server 900 standard development parameter setting values applied to the liquid crystal display apparatus 102 (refer to step S1006). The server 900 can hold a plurality of sets of standard development parameter setting values applicable to the liquid crystal display apparatus or other output apparatus in the data storage section 902.

Next, the network interface 911 of the digital camera 910 notifies the liquid crystal display apparatus 102 of unavailability of development parameter setting values corresponding to the liquid crystal display apparatus 102 presently used by a user and executing development processing using the standard LCD-oriented development parameter setting values. At the same time, the control section 209 sends an inquiry to the liquid crystal display apparatus 102 to determine whether to obtain development parameter setting values of the connected liquid crystal display apparatus 102 (refer to step S1007).

If the liquid crystal display apparatus 102 receives a command entered by the user's operation requiring no acquisition of development parameter setting values (i.e., NO in step S1007), the digital camera 910 goes into an event waiting state (refer to step S1015).

On the other hand, if the liquid crystal display apparatus 102 receives a command entered by the user's operation requiring acquisition of development parameter setting values (i.e., YES in step S1007), the control section 209 of the digital camera 910 requests the liquid crystal display apparatus 102 to transmit URL information indicating an address of site (server) where development parameter setting values can be acquired (refer to step S1008).

The control section 209 of the digital camera 910 receives URL information indicating the address (i.e. web site) of development parameter setting values from the liquid crystal display apparatus 102. The control section 209 starts acquiring (downloading) development parameter setting values corresponding to the type of the connected liquid crystal display apparatus 102 via the network 104 from the site (server) corresponding to the obtained URL (refer to step S1009). In the second exemplary embodiment, the server 900 can acquire (download) the required development parameter setting values.

To temporarily set standard development parameter setting values to the image processing section 202 and the image compression section 203 is useful if acquiring development parameter setting values from the external site (server) takes a long time.

When a predetermined time has elapsed, the control section 209 of the digital camera 910 determines whether acquisition of development parameter setting values is completed (refer to step S1011). If downloading the development parameter setting values fails due to time-out (i.e., NO in step S1011), the control section 209 of the digital camera 910 notifies the liquid crystal display apparatus 102 of unavailability of development parameter setting values (refer to step S1010). Then, the digital camera 910 goes into an event waiting state (refer to step S1015).

If acquisition of development parameter setting values is succeeded (i.e., YES in step S1011), the control section 209 of the digital camera 910 sends the acquired development parameter setting values to the image processing section 202 and the image compression section 203 (refer to step S1012). At the same time, the control section 209 transmits the acquired development parameter setting values to the server 900 (refer to step S1013). Furthermore, the control section 209 notifies the liquid crystal display apparatus 102 of acquisition of development parameter setting values (refer to step S1014). The liquid crystal display apparatus 102 executes display processing similar to the processing shown in FIG. 6 based on the notice. Then, the digital camera 910 goes into an event waiting state (refer to step S1015).

The operation performed by the liquid crystal display apparatus 102 according to the second exemplary embodiment is basically similar to the processing shown in FIG. 4, although the liquid crystal display apparatus 102 directly communicates with the digital camera 910. Therefore, its description is not repeated here. Furthermore, when the liquid crystal display apparatus 102 displays visible image data converted from RAW format image data on its display screen, the liquid crystal display apparatus 102 performs an operation similar to the processing shown in FIG. 7, except that the liquid crystal display apparatus 102 directly communicates with the digital camera 910. Therefore, its description is not repeated.

As described above, the system according to the second exemplary embodiment includes the digital camera 910 directly connected to the network. Even in such an arrangement, the second exemplary embodiment can obtain effects comparable to those of the first exemplary embodiment.

Furthermore, in each of the above-described exemplary embodiments, the development processing is performed by the digital camera. In addition to the development processing, color management processing using an ICC profile can be realized in the same manner. Namely, in the first exemplary embodiment, the ICC profile is stored in the adapter. In the second exemplary embodiment, the ICC profile is stored in the server 900. The color management processing can be executed based on ICC profile information obtained from the adapter or the server.

Furthermore, software program code for realizing the functions of the above-described exemplary embodiments can be supplied to a system or an apparatus connected to various devices. A computer (or CPU or micro-processing unit (MPU)) in the system or the apparatus can execute the program to operate the devices to realize the functions of the above-described exemplary embodiments. Accordingly, the present invention encompasses the program code installable in a computer when the functions or processes of the exemplary embodiments can be realized by the computer.

In this case, the program code itself can realize the functions of the exemplary embodiments. The equivalents of programs can be used if they possess comparable functions. Furthermore, the present invention encompasses supplying the program code to a computer, such as a storage (or recording) medium storing the program code. In this case, the type of program can be any one of object code, interpreter program, and OS script data. A storage medium supplying the program can be selected from any one of a flexible (floppy) disk, a hard disk, an optical disk, a magneto-optical (MO) disk, a compact disk-ROM (CD-ROM), a CD-recordable (CD-R), a CD-rewritable (CD-RW), a magnetic tape, a non-volatile memory card, a ROM, and a DVD (DVD-ROM, DVD-R).

The method for supplying the program includes accessing a web site on the Internet using the browsing function of a client computer, when the web site allows each user to download the computer program of the present invention, or compressed files of the programs having automatic installing functions, to a hard disk or other recording medium of the user.

Furthermore, the program code constituting the programs of the present invention can be divided into a plurality of files so that respective files are downloadable from different web sites. Namely, the present invention encompasses WWW servers that allow numerous users to download the program files so that the functions or processes of the present invention can be realized on their computers.

Furthermore, enciphering the programs of the present invention and storing the enciphered programs on a CD-ROM or comparable recording medium is an exemplary method when the programs of the present invention are distributed to the users. The authorized users (i.e., users satisfying predetermined conditions) are allowed to download key information from a page on the Internet. The users can decipher the programs with the obtained key information and can install the programs on their computers. When the computer reads and executes the installed programs, the functions of the above-described exemplary embodiments can be realized.

Furthermore, an operating system (OS) or other application software running on the computer can execute part or all of the actual processing based on instructions of the programs.

Furthermore, the program code read out of a storage medium can be written into a memory of a function expansion board equipped in a computer or into a memory of a function expansion unit connected to the computer. In this case, based on an instruction of the program, a CPU provided on the function expansion board or the function expansion unit can execute part or all of the processing so that the functions of the above-described exemplary embodiments can be realized.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-056495 filed Mar. 2, 2006, which is hereby incorporated by reference herein in its entirety.

What is claimed is:

1. An image transmission apparatus capable of connecting to an image pickup apparatus and configured to transmit image data captured by the image pickup apparatus to an output apparatus, the image transmission apparatus comprising:
a first communication unit configured to obtain identification information of the image pickup apparatus;
a second communication unit configured to communicate via a network and to obtain type information of the output apparatus;
a storage unit configured to store a plurality of sets of parameters into a memory; and
a controller configured to select, from the plurality of sets of parameters stored in the memory, a set of parameters corresponding to the identification information of the image pickup apparatus received by the first communication unit and the type information of the output apparatus received by the second communication unit, and output the selected set of parameters to the image pickup apparatus which is capable of converting image data into visible image data based on the selected set of parameters,
wherein the first communication unit obtains visible image data from the image pickup apparatus, and the second communication unit transmits the obtained visible image data to the output apparatus,
the controller obtains location information on the network for obtaining the set of parameters from the output apparatus in a case where the set of parameters corresponding to the identification information of the image pickup apparatus and the type information of the output apparatus are not stored in the memory, and obtains the set of parameters from a server corresponding to the obtained location information via the network.

2. The image transmission apparatus according to claim 1, wherein the image pickup apparatus coverts RAW format image data into visible image data based on the selected set of parameters.

3. The image transmission apparatus according to claim 1, wherein the output device comprises one of a display device or a printing device.

4. A method for controlling an image transmission apparatus capable of connecting to an image pickup apparatus and configured to transmit image data captured by the image pickup apparatus to an output apparatus, the method comprising:

obtaining identification information of the image pickup apparatus;

obtaining type information of the output apparatus;

selecting, from a plurality of sets of parameters stored in a memory, a set of parameters corresponding to the obtained identification information of the image pickup apparatus and the obtained type information of the output apparatus;

outputting the selected set of parameters to the image pickup apparatus which is capable of converting image data into visible image data based on the selected set of parameters;

obtaining visible image data from the image pickup apparatus; and transmitting the obtained visible image data to the output apparatus, wherein the image transmission apparatus obtains location information on the network for obtaining the set of parameters from the output apparatus in a case where the set of parameters corresponding to the identification information of the image pickup apparatus and the type information of the output apparatus are not stored in the memory, and obtains the set of parameters from a server corresponding to the obtained location information via the network.

5. The method according to claim 4, wherein the image pickup apparatus coverts RAW format image data into visible image data based on the selected set of parameters.

6. The method according to claim 4, wherein the output device comprises one of a display device or a printing device.

7. A computer readable storage medium containing computer-executable instructions for controlling an image transmission apparatus capable of connecting to an image pickup apparatus and configured to transmit image data captured by the image pickup apparatus to an output apparatus, the medium comprising:

computer-executable instructions for obtaining identification information of the image pickup apparatus;

computer-executable instructions for obtaining type information of the output apparatus;

computer-executable instructions for selecting, from a plurality of sets of parameters stored in a memory, a set of parameters corresponding to the acquired identification information of the image pickup apparatus and the acquired type information of the output apparatus;

computer-executable instructions for outputting the selected set of parameters to the image pickup apparatus which is capable of converting image data into visible image data based on the selected set of parameters;

computer-executable instructions for obtaining visible image data from the image pickup apparatus; and computer-executable instructions for transmitting the obtained visible image data to the output apparatus, computer-executable instructions for obtaining location information on the network for obtaining the set of parameters from the output apparatus in a case where the set of parameters corresponding to the identification information of the image pickup apparatus and the type information of the output apparatus are not stored in the memory, and obtaining the set of parameters from a server corresponding to the obtained location information via the network.

8. An apparatus comprising:

a communication interface configured to connect an output apparatus via a network;

an image processing unit configured to obtain information for processing the image to output to the output apparatus so that the output apparatus outputs the image and for obtaining a set of parameters corresponding to the output apparatus; and an obtaining unit configured to obtain location information on the network from the output apparatus, obtaining the set of parameters corresponding to the output apparatus, and obtains the set of parameters from a server corresponding to the obtained location information via the network;

wherein the image processing unit processes an image based on the set of parameters obtained by the obtaining unit and the image is transmitted to the output apparatus via the communication interface.

9. The apparatus according to claim 8, wherein the image processing unit converts RAW format image data into visible image data.

10. The apparatus according to claim 8, wherein the output apparatus comprises one of a display device or a printing device.

* * * * *